(12) United States Patent
Coronado et al.

(10) Patent No.: US 9,932,727 B2
(45) Date of Patent: Apr. 3, 2018

(54) FLEXIBLE DRAINAGE ASSEMBLY

(71) Applicant: Coflex S.A. de C.V., Monterrey (MX)

(72) Inventors: Eduardo Coronado, San Pedro Garza Garcia (MX); Mauricio Coronado, San Pedro Garza Garcia (MX); Jorge Sada, San Pedro Garza Garcia (MX); Humberto Flores-Villarreal, San Pedro Garza Garcia (MX); Javier Canales, Monterrey (MX)

(73) Assignee: Coflex S.A. de C.V., Monterrey (MX)

( * ) Notice: Subject to any disclaimer, the term of this patent is extended or adjusted under 35 U.S.C. 154(b) by 0 days.

(21) Appl. No.: 14/101,286

(22) Filed: Dec. 9, 2013

(65) Prior Publication Data
US 2014/0090166 A1  Apr. 3, 2014

Related U.S. Application Data

(63) Continuation of application No. 12/415,799, filed on Mar. 31, 2009, now Pat. No. 8,621,683.

(60) Provisional application No. 61/040,977, filed on Mar. 31, 2008.

(51) Int. Cl.
| | | |
|---|---|---|
| *E03C 1/181* | (2006.01) | |
| *E03C 1/20* | (2006.01) | |
| *F16L 43/00* | (2006.01) | |
| *F16L 55/07* | (2006.01) | |

(52) U.S. Cl.
CPC .............. *E03C 1/20* (2013.01); *F16L 43/008* (2013.01); *F16L 55/07* (2013.01); *Y10T 29/49826* (2015.01)

(58) Field of Classification Search
USPC ............ 4/679; 285/131.1, 300, 135.4, 222.5, 285/121, 226; 138/122
See application file for complete search history.

(56) References Cited

U.S. PATENT DOCUMENTS

| | | | | |
|---|---|---|---|---|
| 1,571,707 A | * | 2/1926 | Casper | ..................... 137/247.27 |
| 2,302,617 A | | 11/1942 | Little | |
| 2,567,165 A | | 9/1951 | Buskirk | |
| 2,644,543 A | | 7/1953 | Russell | |

(Continued)

FOREIGN PATENT DOCUMENTS

| | | |
|---|---|---|
| CA | 1087532 A1 | 10/1980 |
| DE | 188515 | 3/1965 |

(Continued)

OTHER PUBLICATIONS

European Search Report, EP09728314.7 dated Mar. 4, 2013.

(Continued)

*Primary Examiner* — Lauren Crane
(74) *Attorney, Agent, or Firm* — Baker & McKenzie LLP (57) ABSTRACT

The present disclosure generally relates to flexible drainage trap assemblies and methods for constructing and installing such drainage traps. In one exemplary embodiment, a flexible drainage trap assembly includes a plumbing fixture connector, a discharge joint, and a trap portion connecting the plumbing fixture connector and discharge joint. The trap portion is shaped in such a way that it is operable to retain a pool of water inside the trap portion. The disclosed flexible drainage assemblies include a flexible portion that has a substantially smooth inner surface.

33 Claims, 8 Drawing Sheets

(56) References Cited

U.S. PATENT DOCUMENTS

| | | |
|---|---|---|
| 2,766,461 A | 10/1956 | Zinkil |
| 2,817,094 A | 12/1957 | Lessley |
| 2,834,615 A * | 5/1958 | Bleakley .................... 285/127.1 |
| 2,987,329 A * | 6/1961 | Barton ........................ F16L 33/26 285/222.5 |
| 3,011,177 A | 12/1961 | Haughey |
| 3,393,267 A * | 7/1968 | Busse ...................... F16L 25/01 174/78 |
| 3,860,978 A | 1/1975 | Wirth |
| 3,891,007 A * | 6/1975 | Kleykamp .................... 138/121 |
| 3,908,208 A * | 9/1975 | McIlroy .................... E03C 1/284 137/247.49 |
| 3,967,324 A | 7/1976 | Olive |
| 4,081,190 A | 3/1978 | Itzler |
| 4,151,864 A | 5/1979 | Thurman |
| 4,173,989 A | 11/1979 | Prest |
| 4,516,278 A | 5/1985 | Lamond |
| 4,754,781 A | 7/1988 | Jan de Putter |
| 4,846,510 A | 7/1989 | Mikol |
| 4,919,462 A | 4/1990 | Matsui et al. |
| 5,071,170 A | 12/1991 | Panella |
| 5,230,109 A | 7/1993 | Zaccai et al. |
| 5,257,836 A * | 11/1993 | Smith .......................... 285/374 |
| 6,519,784 B2 | 2/2003 | Carwile |
| 6,641,177 B1 | 11/2003 | Pinciaro |
| 6,719,294 B2 | 4/2004 | Nguyen et al. |
| 8,621,683 B2 | 1/2014 | Coronado et al. |
| 2003/0090112 A1* | 5/2003 | Baughman .......... F16L 25/0045 285/374 |
| 2010/0037376 A1 | 2/2010 | Hughes |

FOREIGN PATENT DOCUMENTS

| | | |
|---|---|---|
| DE | 1784665 | 1/1972 |
| EP | 0913611 A1 | 6/1999 |
| EP | 1329561 A2 | 7/2003 |
| RU | 8008 U1 | 10/1998 |

OTHER PUBLICATIONS

PCT/IB2009/005483, International Search Report and Written Opinion of the International Searching Authority dated Oct. 22, 2009.

PCT/IB2013/002365, International Search Report dated Jun. 23, 2014.

Canadian Office Action dated Dec. 23, 2014 in Canadian Patent Application No. 2661060.

International Preliminary Report on Patentability in PCT/IB2009/005483.

* cited by examiner

FLEXIBLE DRAINAGE ASSEMBLY

CROSS-REFERENCE TO RELATED APPLICATIONS

This patent application is a continuation of patent application Ser. No. 12/415,799 filed Mar. 31, 2009, entitled "Flexible drainage trap" which claims priority to provisional application No. 61/040,977 filed Mar. 31, 2008, entitled "Flexible and adjustable drainage trap with substantially smooth inner surface," both of which are herein incorporated by reference for all purposes.

TECHNICAL FIELD

The present disclosure relates generally to drainage traps, and more particularly to flexible drainage trap assemblies including a flexible portion that has a substantially-smooth inner surface, and methods for constructing and installing such flexible drainage assemblies.

BACKGROUND

In the plumbing industry, drainage traps are fixtures having a U-, J-, S-, or P-shaped portion and are used to trap fumes, gases, and odors within a drainage piping system. Most plumbing fixtures, such as bathroom sinks, kitchen sinks, bath tubs and water closets, include a drainage trap. A drainage trap may either be an integral part of the plumbing fixture or a separate fixture that can be releasably coupled to the plumbing fixture. In the present application, "internal traps" should be understood to be drainage traps that are an integral part of the plumbing fixture, and "external traps" should be understood to be drainage traps that can be releasably coupled to the plumbing fixture. It is to be appreciated that external traps are more common than internal traps, but in any embodiment described herein, external and internal traps can be substituted for each other.

Once the drainage trap is installed, water is flushed down the plumbing fixture, and the shape of the drainage trap allows a small pool of water to be retained within the drainage trap. The pool of water in the drainage trap functions as a seal that prevents the fumes, gases, and odors from escaping into the external living space in a building.

BRIEF SUMMARY

One embodiment disclosed in the present disclosure relates to a drainage trap assembly for maintaining a water seal that prevents gases in a drainage piping system from escaping. The drainage trap assembly includes a trap having first and second end portions and a trap portion between the first and second end portions, the trap being operable to retain a pool of water in the trap portion. The drainage trap assembly also includes a plumbing fixture connector coupled to the first end portion of the trap, the plumbing fixture connector being operable to be connected to a discharge of a plumbing fixture. The drainage trap assembly further includes a discharge joint coupled to the second end portion of the trap, the discharge joint being operable to be connected to a drainage pipe output. The discharge joint comprises a flexible hose having a substantially smooth inner surface. In some embodiments, the discharge joint further comprises an elbow connecting a first end of the flexible hose to the second end portion of the trap, and a drainage connector operable to connect a second end of the flexible hose to the drainage pipe output.

Another embodiment of the drainage trap assemblies disclosed in the present disclosure includes a trap having first and second end portions and a trap portion between the first and second end portions, the trap being operable to retain a pool of water in the trap portion. The drainage trap assembly also includes a plumbing fixture connector operable to be connected to a discharge of a plumbing fixture, and a flexible hose connecting the plumbing fixture connector and the trap. A first end of the flexible hose is coupled to the plumbing fixture connector, and a second end of the flexible hose is coupled to the first end portion of the trap. Furthermore, the inner surface of the flexible hose is substantially smooth. The drainage trap also includes a discharge joint coupled to the second end of the trap, the discharge joint being operable to be connected to a drainage pipe output.

In some embodiments of the drainage trap assembly, the first end portion of the trap comprises a Y-fitting having first and second joint portions, and the second end of the flexible hose is mounted on the first joint portion. The drainage trap assembly further comprises a second plumbing fixture connector operable to be connected to a second discharge of the plumbing fixture or a discharge of a second plumbing fixture, and a second flexible hose connecting the second plumbing fixture connector and the second joint portion of the trap. A first end of the second flexible hose is coupled to the second plumbing fixture connector, and a second end of the second flexible hose is coupled to the second joint portion of the Y-fitting of the trap. Additionally, the inner surface of the second flexible hose is substantially smooth.

Related methods for constructing and installing the disclosed drainage trap assembly between plumbing fixture discharges and drainage outlets are also disclosed herein.

BRIEF DESCRIPTION OF THE DRAWINGS

Reference is now made to the following descriptions taken in conjunction with the accompanying drawings.

DETAILED DESCRIPTION

Various aspects of a flexible drainage trap assembly and related methods for installing a flexible drainage trap assembly according to the present disclosure are described. It is to be understood, however, that the following explanation is merely exemplary in describing the devices and methods of the present disclosure. Accordingly, any number of reasonable and foreseeable modifications, changes and substitutions are contemplated without departing from the spirit and scope of the present disclosure.

Figures 1, 2A:
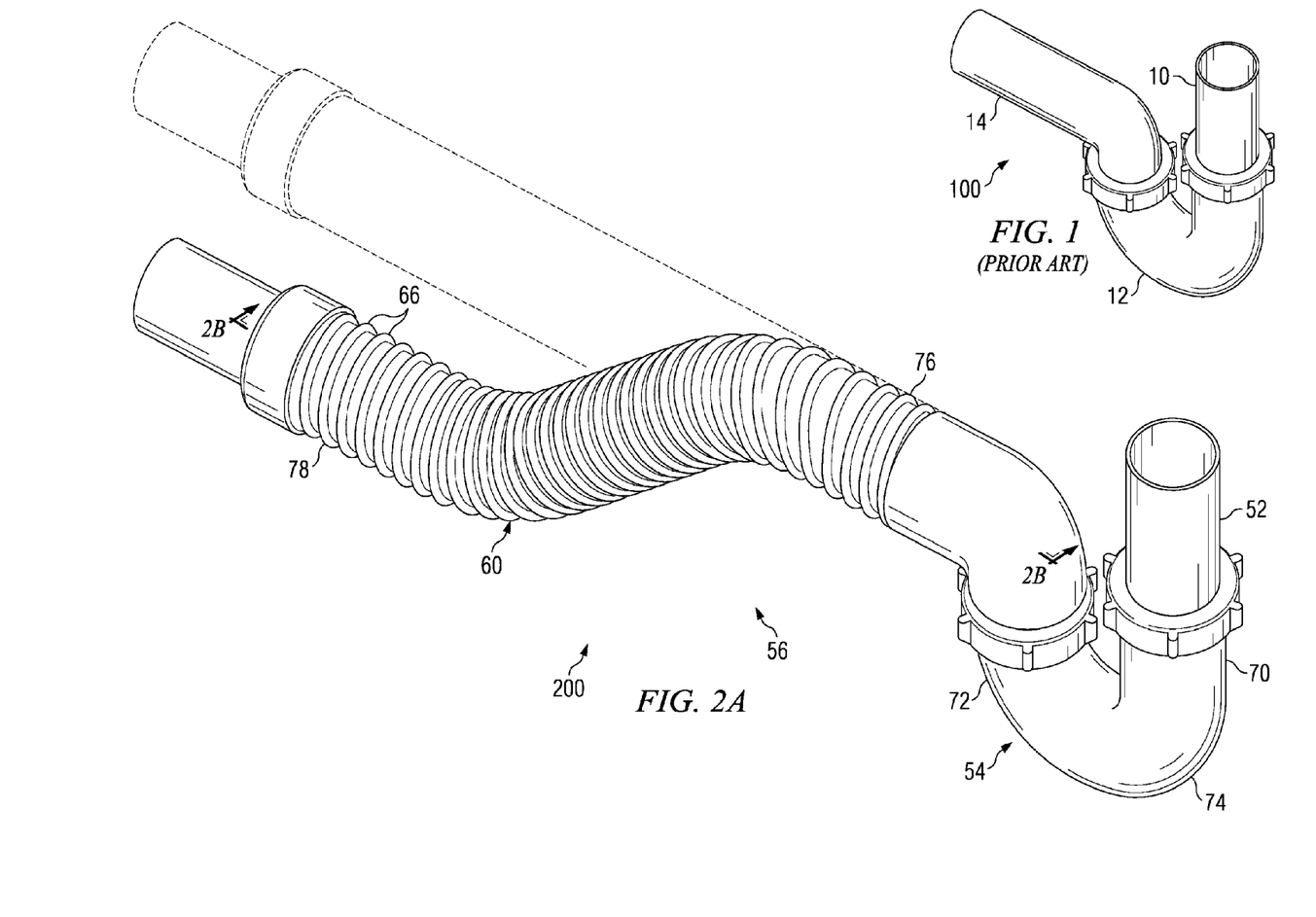
FIG. 1 is a perspective view of a rigid drainage trap.
FIG. 2A is a perspective view of a flexible drainage trap assembly according to one exemplary embodiment of the present disclosure.

FIG. 1 illustrates a conventional rigid drainage trap 100, which includes three parts: a tailpiece 10, a trap 12, and a discharge joint 14. The tailpiece 10 and discharge joint 14 provide a connection to the discharge of a plumbing fixture (not shown) and the drainage pipe output (not shown), respectively. The trap 12 is shaped in such a way that it is operable to retain a pool of water, and may be configured in a variety of shapes, such as J-, P-, S-, and U-shape. These three parts of the rigid drainage trap 100 are assembled to form the rigid drainage trap 100. In some embodiments, the J-trap 12 of the rigid drainage trap 100 includes a clean-out hole (not shown), which allows the water seal to be manually drained. The clean-out hole, however, also provides space for waste accumulation and bacteria growth.

The installation of the rigid drainage trap 100 between the discharge of the plumbing fixture and the drainage pipe output can be difficult. The alignment between the discharge of the plumbing fixture and the drainage pipe output can vary significantly because the plumbing fixtures can have a wide variety of designs. For example, bathroom sinks can be designed to be seated below or on the top of the counter. The difference in designs may lead to the plumbing fixtures having discharges in different positions, and, consequently, connecting the discharges of different plumbing fixtures to the drainage pipe output may require drainage traps of various dimensions. Furthermore, some plumbing fixtures have a plurality of discharges, such as a double kitchen sink.

To improve the ease of installing drainage traps, some drainage traps 100 have been made more flexible by constructing the trap 12 using a flexible material. To connect such a flexible trap 12 to the tailpiece 10 and discharge joint 14 of the drainage trap 100, hose clamps (not shown) are positioned around end portions of the flexible trap 12 and manually tightened. One disadvantage of the flexible trap 12 is that the hose clamps could be difficult to install if there is a lack of room around the plumbing fixture for handling tools to install the clamps. Moreover, another disadvantage of the flexible trap 12 is that it provides only limited flexibility due to the inherent shape of the flexible trap 12.

Some other drainage traps 100 have a corrugated portion. While the corrugated portion provides some flexibility, the uneven inner surface of the corrugated portion can trap and accumulate organic wastes. The accumulation of organic wastes can consequently lead to problems such as excessive bacteria and fungus growth and the clogging of the drainage trap.

Figure 2B:
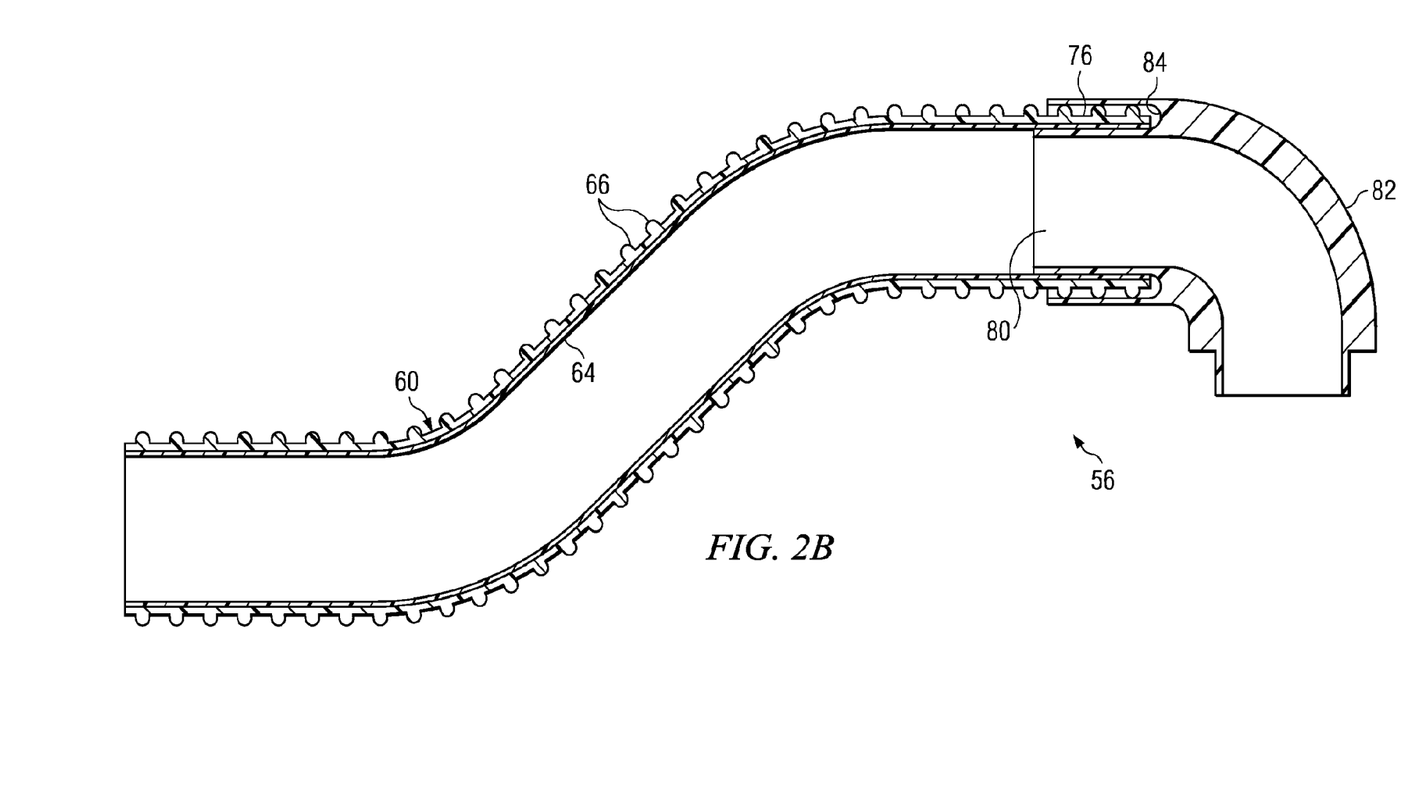
FIG. 2B is a cross-sectional view of the flexible drainage trap assembly shown in FIG. 2A.
Figure 3:
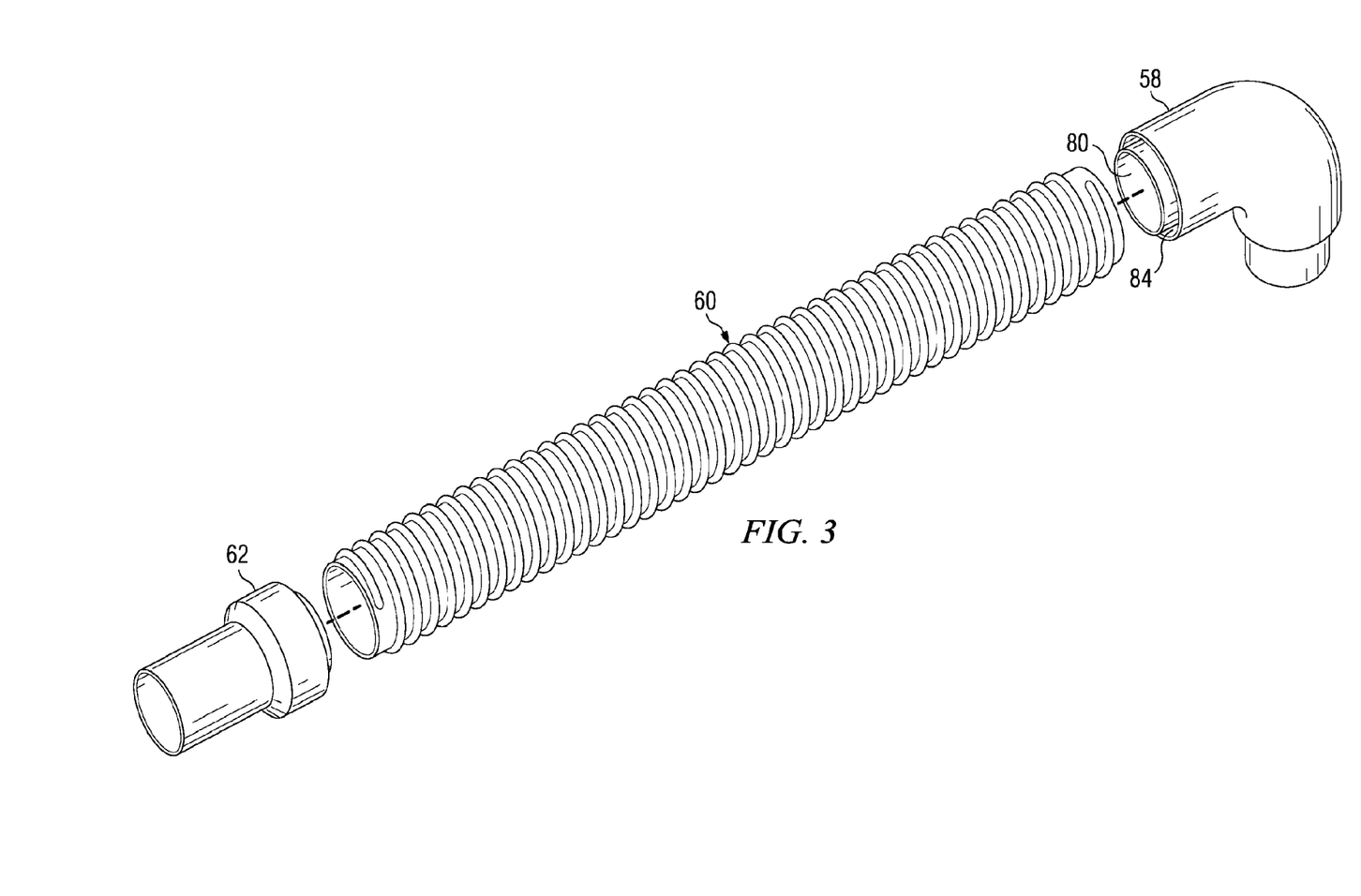
FIG. 3 is an exploded view of a flexible discharge joint according to one embodiment of the present disclosure.

Referring to FIGS. 2A, 2B, and 3, a flexible drainage trap assembly 200 includes a plumbing fixture connector 52, a trap 54, and a flexible drainage joint 56. The trap 54 includes first and second end portions 70 and 72, and a trap portion 74 between the first and second end portions 70 and 72. When the flexible drainage trap assembly 200 is installed, the first and second end portions 70 and 72 have higher elevations relative to the trap portion 74, which allows the trap 54 to retain a pool of water in the trap portion 74 by gravity.

The plumbing fixture connector 52 is coupled to the first end portion 70 of the trap 54, and the flexible discharge joint 56 is coupled to the second end portion 72 of the trap 54. The plumbing fixture connector 52 can be a tailpiece or an adapter that is operable to be connected to a discharge of a plumbing fixture (not shown) and provide a conduit from the plumbing fixture to the trap 54. In some embodiments, the plumbing fixture connector 52 may include a combination of tailpiece and adapter. The flexible discharge joint 56 is operable to be connected to a drainage pipe output (not shown) and provides a conduit from the trap 54 to the drainage pipe output.

The flexible discharge joint 56 comprises a flexible hose 60 having a substantially smooth inner surface 64. The substantially smooth inner surface 64 offers the advantage of not being susceptible to accumulating organic waste inside the flexible hose 60 since no grooves are exposed on its interior surface as found on typical corrugated piping. The flexible hose 60 can be made of any flexible material known in the art to impart flexibility to the discharge joint 56, including any thermoplastic rubber, any engineered polymer, or any chemically treated materials capable of resisting chemicals such as chlorides and acids. The flexible hose 60 also may be resistant to organic gases and fungus attacks. In one exemplary embodiment, the flexible hose 60 is made from a polyvinyl chloride (PVC) compound.

In some embodiments, the outer surface of the flexible hose 60 may be configured to have a corrugated portion to further improve the flexibility of the flexible hose 60. The flexible hose 60 may be reinforced by any suitable means known in the art to improve its strength. In the exemplary embodiment illustrated in FIGS. 2A, 2B, and 3, the flexible hose 60 is reinforced by a plurality of rings 66 extending radially and outwardly from the outer surface of the flexible hose 60. In the illustrated embodiment, those rings 66 are disposed in a threaded pattern around the outer surface of the flexible hose 60, however, other embodiments may include other types of reinforcement rings 66. Additionally, the flexible hose 56 may be constructed such that it resiliently maintains its curvature once it is bent into a desired shape. In such embodiments, the external portion of the flexible hose 56 may be collapsible/expandable piping, similar to telescopic or corrugated piping or tubing, which maintains one or more bends imparted to it when left in place. However, the internal portion of the flexible hose 56 is smooth, as discussed above, and sufficiently flexible to submit to any bends held by the external piping while maintaining a substantially smooth internal surface throughout the length of the flexible hose 56. Such a flexible hose 56 may be constructed from two separate materials comprising the internal and external portions, or these two portions may be integrally formed. Moreover, the internal and external portions maybe constructed from the same material, or they may each be from one or more different materials even if integrally formed. For example, the external portion may be metal or hard plastic, while the internal portion is a soft plastic, silicone or rubber. In such embodiments, the flexible tube 56 may be formed by disposing molten plastic, silicone or rubber within a hard external portion, and then allowing the molten material to cool therein leaving a substantially smooth internal surface along the length of the flexible tube 56.

In the embodiments shown in FIGS. 2A, 2B, and 3, the flexible drainage joint 56 further includes an elbow 58 connecting a first end 76 of the flexible hose 60 to the trap 54, and a drainage connector 62 coupled to a second end 78 of the flexible hose 60 for connection to a drainage pipe outlet (not shown). The flexible hose 60 may be releasably coupled to the elbow 58 and drainage connector 62 using any connecting mechanism known in the art, including mechanical coupling, welding, chemical bonding, or pressure coupling, or even by a technique or mechanism later developed. In some embodiments, the elbow 58, flexible hose 60, and the drainage connector 62 may be integrally molded into one unitary part to substantially reduce or eliminate the risk of leakage and simplify the installation of the drainage trap assembly 200.

In the illustrated embodiment, the elbow 58 has a central opening 80 defined therethrough, and an outer wall 82. The outer wall 82 has a circumferential slot 84 defined therein, which is operable to receive the first end portion 76 of the flexible hose 60. When the end portion 76 is fitted and received in the circumferential slot 84, the friction between the outer wall 82 and the end portion 76 allows the elbow 58 and flexible 60 to be securely and hermetically coupled. As such, the elbow 58 and drainage connector 62 are coupled to the flexible hose 60 by pressure without any need of tooling, solvent, or cement. The pressure coupling of the elbow 58 and drainage connector 62 to the flexible hose 60 allows an installer to dismantle the discharge joint 56 as many times as desired by pulling them apart. These parts of the discharge joint 60 may be reassembled easily by pushing them together. In other embodiments in which the elbow 58, flexible hose 60, and the drainage connector 62 are integrally molded into one unitary part, the possibility of leakage is substantially reduced or eliminated, and the installation of the drainage trap assembly 200 is simplified. However, accessibility to the inside of certain portions may thereby be limited, thus leaving to the installer which embodiment better suits his needs.

In one exemplary embodiment of an installation, the flexible drainage trap assembly 200 is installed by first connecting the plumbing fixture connector 52 to the discharge of a plumbing fixture (not shown). Before connecting the discharge joint 56 to the drainage pipe outlet (not shown), the flexible hose 60 can be bent to adjust the orientation of the discharge joint 56 so that it matches the alignment of the drainage pipe outlet. Once the discharge joint 56 and the drainage pipe outlet are properly aligned, they can be connected to complete the installation. It is to be appreciated that the flexible drainage trap assembly 200 provides a high degree of adjustment during installation, thus accommodating various misalignments between plumbing fixture discharges and discharge pipes. In a particular embodiment, aligning the discharge joint 56 and the drainage pipe outlet may require disassembling the discharge joint 56 and cutting away a piece of the flexible hose 60 to make it shorter. The discharge joint 56 is then reassembled and aligned before being connected to the drainage pipe outlet. In another embodiment, the drainage pipe outlet may be too distant from the drainage trap assembly 200 and the flexible hose 60 can be replaced with a longer hose. In either such embodiment, the quick-connectability of the flexible hose 60 to other components as described above allows for quick, on-site adjustments to be made during installation.

Figure 4:
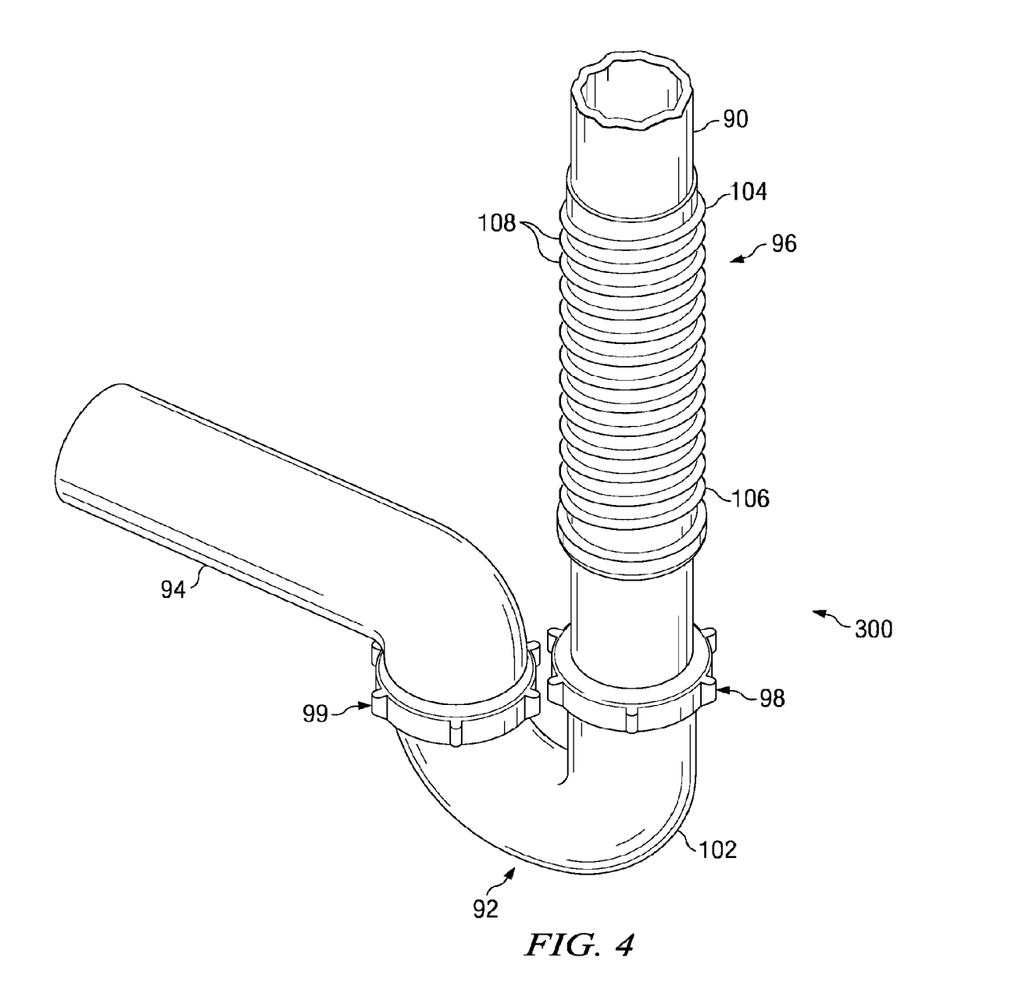
FIG. 4 is a perspective view of a flexible drainage trap assembly according to another exemplary embodiment of the present disclosure.

Turning now to FIG. 4, a flexible drainage trap assembly 300 includes a plumbing fixture connector 90, a trap 92, a drainage joint 94, and a flexible hose 96. Similar to the trap 54 as discussed above, trap 92 comprises first and second end portions 98 and 99, and a trap portion 102 between the first and second end portions 98 and 99 that is operable to retain a pool of water in the trap portion 102 by gravity. The trap 92 is connected to the plumbing fixture connector 90 by the flexible hose 96. A first end 104 of the flexible hose is coupled to the plumbing fixture connector 90, and a second end 106 of the flexible hose 96 is coupled to the first end portion 98 of the trap 92. The second end portion 99 of the trap 92 is coupled to the discharge joint 94. The plumbing fixture connector 90 and discharge joint 94 are operable to be connected to a discharge of a plumbing fixture (not shown) and a drainage pipe output (not shown), respectively. The plumbing fixture connectors 90 can include a tailpiece, an adapter, or a combination of both.

Like the flexible hose 60 described above, the flexible hose 96 includes an inner surface (not shown) that is substantially smooth, and can be made of any flexible material known in the art to impart flexibility to the drainage trap assembly 300. In the embodiment shown in the FIG. 4, the flexible hose 96 also includes a plurality of rings 108 extending radially and outwardly from the outer surface of the flexible hose 96. As before, these rings 108 may be in a thread-like pattern or they may be individually formed on the hose 96.

Figure 5:
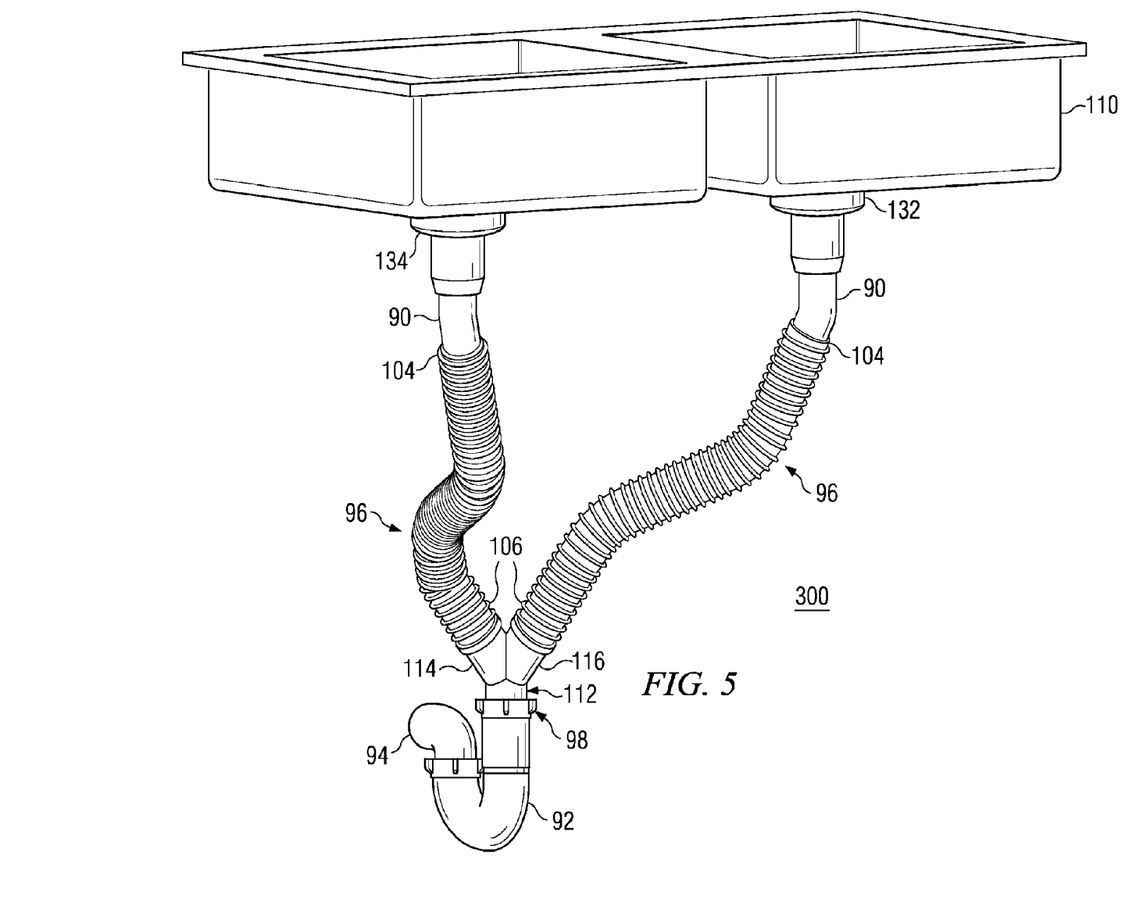
FIG. 5 is a perspective view of a flexible drainage trap assembly according to yet another exemplary embodiment of the present disclosure.
Figure 8:
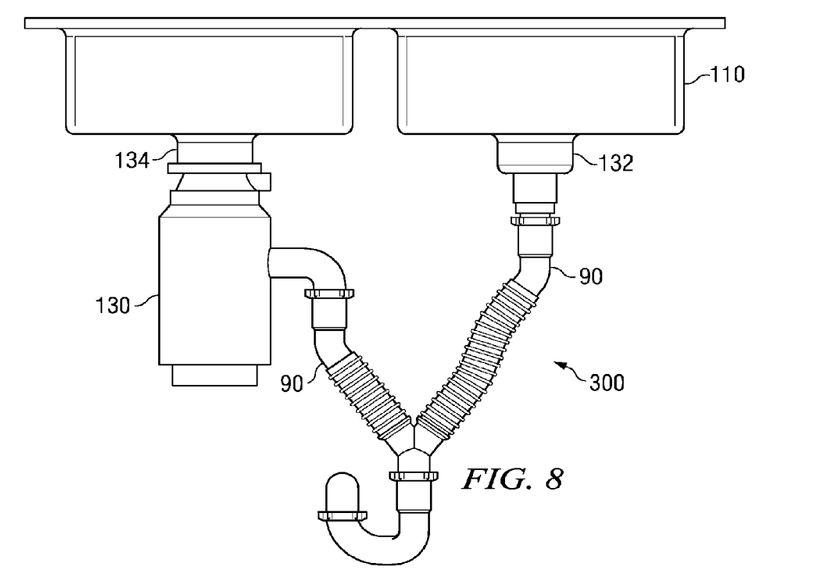
FIG. 8 is a perspective view of a flexible drainage trap assembly connected to a waste disposal unit.
Figure 9:
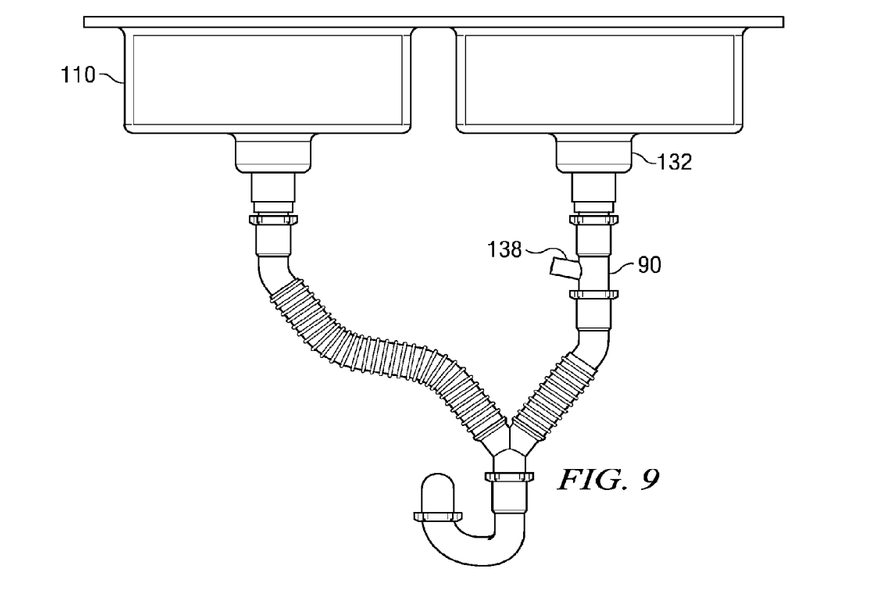
FIG. 9 is a perspective view of an exemplary embodiment of a flexible drainage trap assembly operable to be connected to a dishwasher unit.

Shown in FIG. 5 is another embodiment of the drainage trap assembly 300, which includes two plumbing fixture connectors 90, each being connected to the first end portion 98 of the trap 92 by a flexible hose 96. The plumbing fixture connectors 90 are operable to be connected to the discharge of the same plumbing fixtures 110 as illustrated in FIG. 5, or to the discharges of two different plumbing fixtures (not shown). In the exemplary embodiment shown in FIG. 8, one of the plumbing fixture connectors 90 is connected to a first discharge 132 of the double sink 110, and the other plumbing fixture connector 90 is connected to the discharge of a waste disposal unit 130, which receives waste from the second discharge 134 of the double sink 110. Shown in FIG. 9 is another exemplary embodiment, in which one of the plumbing fixture connectors 90 includes a T-adapter 138. The T-adapter 138 allows the referenced plumbing fixture connector 90 to be connected to both the first discharge 132 of the double sink 110 and a second plumbing fixture (not shown) such as a dishwasher.

Figure 6A:
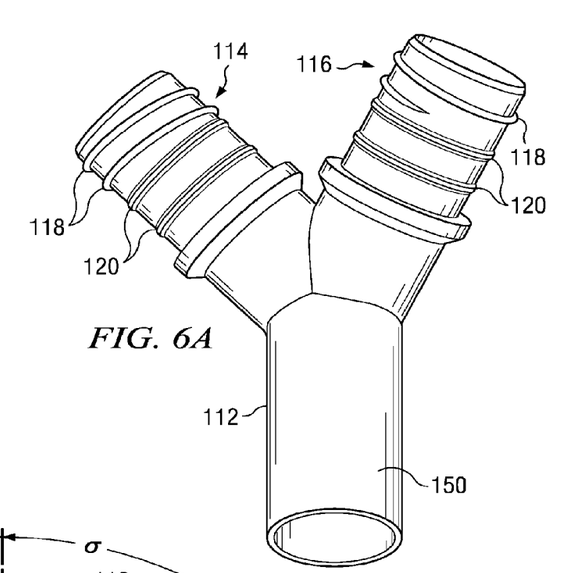
FIG. 6A is a perspective view of an exemplary embodiment of a Y-joint.

In some embodiments, the first end portion 98 of the trap 92 comprises a Y-fitting 112 as shown in FIG. 5, which in turn includes first and second joint portions 114 and 116 for connection to the flexible hoses 96. The first ends 104 of the flexible hoses 96 are mounted on the plumbing fixture connectors 90, and the second ends 106 of the flexible hoses 96 are mounted on the first and second joint portions 114 and 116 of the Y-fitting 112. Referring to FIGS. 6A, B, and C, the Y-fitting 112 includes threads 118 on the outer surface of the first and second joint portions 114 and 116. It will be appreciated that threads are an example of inclined planes wrapped around an object such as the joint portions. As the second ends 106 of the flexible hoses 96 are disposed over the first and second joint portions 114 and 116, the wall of the flexible hoses 96 conforms to the contour of the threads 118, which allows the threads 118 to engage the plurality of reinforcement rings 108. As such, the flexible hoses 96 are threadably connected to the joint portions 114 and 116. It is to be appreciated that other securing mechanisms known in the art or later developed can also be implemented in the embodiments described herein to secure the flexible hoses 96 to the joint portions 114 and 116. Moreover, such threaded connection of a flexible hose constructed as disclosed herein may also be used in other embodiments of trap assemblies, such as the earlier embodiments discussed above.

The Y-fitting 112 also includes at least one sealing member 120 extending radially and outwardly from the outer surface of the first and second joint portions 114 and 116. The sealing member 120 cooperates with the inner smooth surface of the flexible hose 96 to provide a substantially water-proof seal. The sealing member 120 may have various cross-sectional profiles depending on the application and design of the drainage trap assembly 300. In some embodiments, a trapezoidal profile as shown in FIG. 6B provides the optimal seal against leakage.

It is to be appreciated that the securing mechanism and the sealing mechanism described above can be implemented in any embodiments described herein in accordance with the principles of the present disclosure. For example, in some embodiments, the first end portion 98 in FIG. 4 may include threads 118 for mounting and securing the second end 106 of the flexible hose 96 as described above. In some other embodiments, the first end portion 98 also may include a sealing member 120 to provide a substantially water-proof seal. Furthermore, although the threads 118 are illustrated on the exterior of the Y-fitting 112, in other embodiments, the threads 118 may be within the Y-fitting 112 and formed at the same pitch as threaded rings formed on a flexible hose. In such embodiments, the flexible hose may threadably engage the Y-fitting 112, while a seal 120 may be provided within the Y-fitting to contact an end of the flexible hose.

Figure 6B:
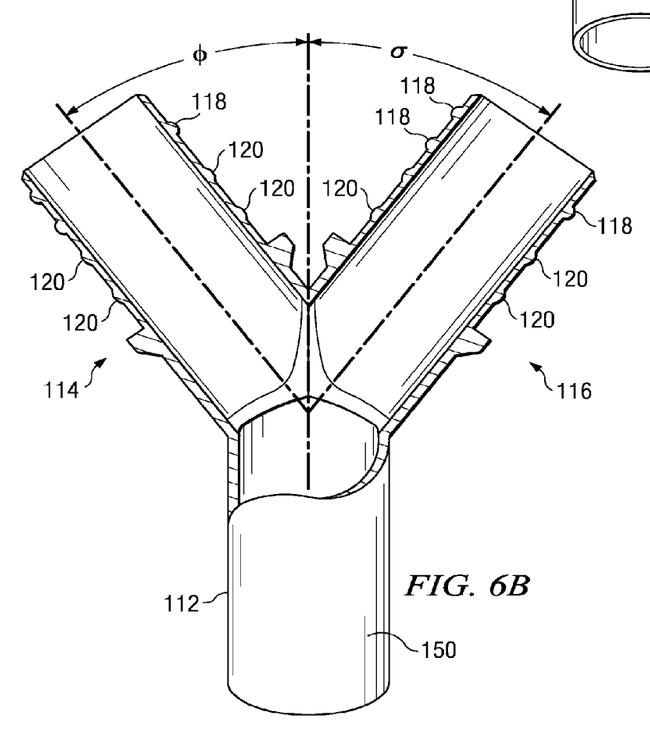
FIG. 6B is a partial, cross-sectional view of the Y-joint shown in FIG. 6A.
Figures 6C, 7:
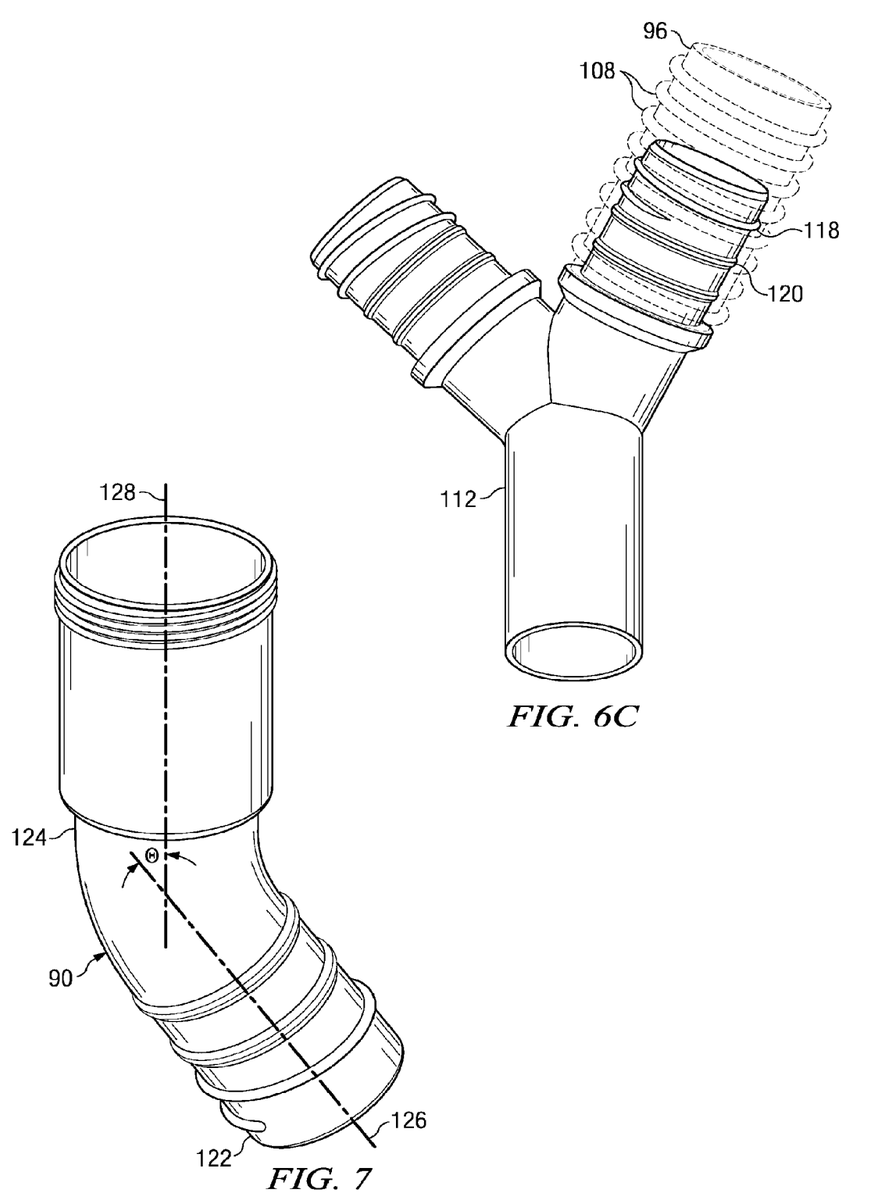
FIG. 6C is a perspective view of the Y-joint shown in FIG. 6A coupled to a flexible hose.
FIG. 7 is a perspective view of an exemplary embodiment of a plumbing fixture connector.

As shown in FIG. 6B, the first and second joint portions 114 and 116 are aligned at angles φ and σ relative to the longitudinal axis of outlet portion 150 of the Y-fitting 112, respectively. The angles φ and σ are the same in some embodiments, and different in other embodiments. The angles φ and σ are acute angles (less than 90 degrees), and in some embodiments, the angles φ and σ are preferably between 25 to 65 degrees. In some particular embodiments, the most preferred angles φ and σ are 45 degrees. Referring now to FIG. 7, an exemplary embodiment of the plumbing fixture connector 90 is shown to include first and second ends 122 and 124, which have first and second longitudinal axes 126 and 128, respectively. The first and second ends 122 and 124 are bent relative to each other such that the first and second axes 122 and 124 form an acute angle θ. In some embodiments, the angle θ is preferably between 15 to 45 degrees. In some particular embodiments, the most preferred angle θ is 32 degrees. The bent plumbing fixture connector 90 and the angular alignment of the joint portions 114 and 116 of the Y-fitting 112 allow for improved alignment between these two components, which in turn. reduces the stress on the connections between the plumbing fixture connectors 90 and the flexible hoses 96, and the flexible hoses 96 and the joint portions 114 and 116 of the Y-fitting 112.

The first end 122 of the plumbing fixture connector 90 can be coupled to the first end 104 of flexible hose 96 using any coupling mechanism know in the art. In some embodiments, the first end 122 may include the threads 118 as described above for securing the flexible hose 96. Additionally, in some embodiments, the first end 122 also may include the sealing member 120 as described above for providing a substantially water-proof seal.

Referring back to FIG. 5, in one exemplary embodiment, the flexible drainage trap assembly 300 is installed by assembling the plumbing fixture connectors 90, flexible hoses 96, trap 92, and the discharge joint 94. The plumbing fixture connectors 90 are loosely coupled to the first and second discharges 132 and 134 of the double sink 110. For example, the plumbing fixture connectors 90 and the first and second discharges 132 and 134 may be threadably coupled. As the discharge joint 94 is connected to the drainage pipe outlet (not shown), the loose coupling of the tailpieces 90 to the first and second discharges 132 and 134 allow the plumbing fixture connectors 90 to position themselves in orientations that reduces the stress on the flexible hose 96. After the discharge joint 94 is connected to the drainage pipe outlet, the coupling between the plumbing fixture connectors 90 and the first and second discharges 132 and 134 are tightened.

It should be appreciated that the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention (s), and their equivalents, that are protected thereby. In all instances, the scope of the claims shall be considered on their own merits in light of the specification, but should not be constrained by the headings set forth herein.

What is claimed is:

1. A drainage assembly, comprising:
 a connector operable to couple with a discharge of a plumbing element;
 a fitting having a joint portion and an outlet portion, the joint portion including a sealing element and a slot defined between a central opening and an outer wall of the fitting; and
 a flexible hose operable to couple to the connector and the fitting, the flexible hose having a substantially smooth inner surface, the flexible hose being made of a material selected from the group consisting of polymers, rubber, silicone, and combinations thereof, and the flexible hose including:
 a first end operable to couple to the connector,
 a second end operable to be inserted into the slot of the joint portion of the fitting and to mount on the outer surface of the central opening of the fitting, such that:
 the second end of the flexible hose is covered by the outer wall of the fitting, and
 the sealing element is in contact with the smooth inner surface of the flexible hose to provide a substantially water-proof seal with a friction fit.

2. The drainage assembly of claim 1, wherein the sealing element extends radially and outwardly from an outer surface of the central opening of the fitting.

3. The drainage assembly of claim 1, wherein the flexible hose includes a plurality of reinforcement rings extending radially and outwardly from an outer surface of the flexible hose.

4. The drainage assembly of claim 1, further comprising a securing mechanism operable to couple with the flexible hose when the second end of the flexible hose is mounted on the outer surface of the central opening of the fitting.

5. The drainage assembly of claim 4, wherein the securing mechanism is operable to mate with a plurality of reinforcement rings extending radially and outwardly from an outer surface of the flexible hose.

6. The drainage assembly of claim 1, further comprising a securing mechanism operable to couple with the flexible hose when the first end of the flexible hose is coupled to the connector.

7. The drainage assembly of claim 6, wherein the securing mechanism is operable to mate with a plurality of reinforcement rings extending radially and outwardly from an outer surface of the flexible hose.

8. The drainage assembly of claim 1, wherein
the connector includes a first end having a first longitudinal axis and a second end having a second longitudinal axis, and
the first and second longitudinal axes form an angle such that the first and second ends are bent relative to each other.

9. The drainage assembly of claim 8, wherein the first and second longitudinal axes form an acute angle.

10. The drainage assembly of claim 9, wherein the acute angle is between 15 to 45 degrees.

11. The drainage assembly of claim 9, wherein the acute angle is 32 degrees.

12. The drainage assembly of claim 1, wherein the fitting includes a Y-fitting.

13. The drainage assembly of claim 12, wherein
the Y-fitting includes first and second joint portions,
the second end of the flexible hose is operable to couple to the first joint portion, and
the drainage assembly includes:
a second connector operable to connect to a second discharge of the plumbing fixture or a discharge of a second plumbing fixture; and
a second flexible hose operable to connect the second connector and the second joint portion of the Y-fitting, a first end of the second flexible hose being operable to couple to the second connector, a second end of the second flexible hose being operable to couple to the second joint portion of the Y-fitting, and an inner surface of the second flexible hose is substantially smooth.

14. The drainage assembly of claim 13, wherein the second plumbing fixture is a waste disposal unit.

15. The drainage assembly of claim 13, wherein
the Y-fitting includes an outlet portion having a longitudinal axis, and
the first joint portion and the longitudinal axis of the outlet portion form an acute angle.

16. The drainage assembly of claim 15, wherein the acute angle is between 25 to 65 degrees.

17. The drainage assembly of claim 15, wherein the acute angle is 45 degrees.

18. A method for installing a drainage assembly, comprising:
assembling a fitting, a connector, and a flexible hose, the fitting having a joint portion and an outlet portion, the joint portion including a slot defined between a central opening and an outer wall of the fitting, the flexible hose connecting the plumbing fixture connector to the joint portion of the fitting, the flexible hose being made of a material selected from the group consisting of polymers, rubber, silicone, and combinations thereof, and the flexible hose having a substantially smooth inner surface; and
connecting the connector to a discharge of a plumbing element, wherein
an end of the flexible hose is operable to mount on the outer surface of the central opening of the fitting, such that a sealing element of the joint portion is in contact with the smooth inner surface of the flexible hose to provide a substantially water-proof seal with a friction fit, and
the connecting includes inserting the end of the flexible hose into the slot such that the end of the flexible hose is covered by the outer wall of the fitting and contacting the inner surface of the flexible hose to the outer surface of the central opening.

19. The method of claim 18, wherein the sealing element extends radially and outwardly from an outer surface of the joint portion.

20. The method of claim 18, wherein
the connector includes a first end having a first longitudinal axis and a second end having a second longitudinal axis, and
the first and second longitudinal axes form an angle such that the first and second ends are bent relative to each other.

21. The method of claim 20, wherein the first and second longitudinal axes form an acute angle.

22. The method of claim 20, wherein the acute angle is between 15 to 45 degrees.

23. A plumbing connector assembly, comprising:
a fitting including:
a joint portion including a slot defined between a central opening and an outer wall, and a sealing element extending radially and outwardly from an outer surface of the central opening;
a first end of the fitting having a first longitudinal axis and a second end of the fitting having a second longitudinal axis, the first and second longitudinal axes forming an angle such that the first and second ends are bent relative to each other; and
a flexible hose including an end operable to be inserted into the slot of the joint portion of the fitting such that the end is covered by the outer wall of the fitting, the flexible hose being made of a material selected from the group consisting of polymers, rubber, silicone, and combinations thereof, wherein
the sealing element is operable to contact a smooth inner surface of the flexible hose to provide a substantially water-proof seal with a friction fit.

24. The plumbing connector assembly of claim 23, wherein the first and second longitudinal axes form an acute angle.

25. The plumbing connector assembly of claim 24, wherein the acute angle is between 15 to 45 degrees.

26. The plumbing connector assembly of claim 23, wherein the acute angle is 32 degrees.

27. The drainage assembly of claim 1, wherein a material of the inner surface of the flexible hose is selected from the group consisting of plastic, silicone and rubber.

28. The drainage assembly of claim 23, wherein
an outer surface of the central opening includes a plurality of outward protrusions, the outward protrusions each defining an inclined plane wrapped around the central opening, and
the inner surface of the flexible hose is operable to contact the outward protrusions.

29. The drainage assembly of claim 1, wherein
the plumbing element includes a plumbing fixture, and
the connector includes a plumbing fixture connector operable to connect to a discharge of the plumbing fixture.

30. The drainage assembly of claim 1, wherein
an outer surface of the central opening includes a first plurality of outward protrusions, the outward protrusions each defining an inclined plane wrapped around the central opening, and
the inner surface of the flexible hose is operable to contact the outward protrusions.

31. The drainage assembly of claim 30, further comprising a securing mechanism operable to couple with a plurality of reinforcement rings extending radially and outwardly from an outer surface of the flexible hose when the second end of the flexible hose is mounted on the outer surface of the central opening of the fitting.

32. The method of claim 18, wherein
an outer surface of the central opening includes a plurality of outward protrusions, the outward protrusions each defining an inclined plane wrapped around the central opening, and
the contacting includes contacting the inner surface of the flexible hose to the outward protrusions.

33. The drainage assembly of claim 30, wherein the inner surface of the flexible hose conforms to the outward protrusions.

* * * * *